United States Patent
Saba

(10) Patent No.: US 8,904,220 B2
(45) Date of Patent: Dec. 2, 2014

(54) INTELLIGENT USER DETERMINABLE POWER CONSERVATION IN A PORTABLE ELECTRONIC DEVICE

(75) Inventor: Maher Saba, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 13/110,976

(22) Filed: May 19, 2011

(65) Prior Publication Data

US 2012/0297215 A1 Nov. 22, 2012

(51) Int. Cl.
*G06F 11/30* (2006.01)
*G06F 1/26* (2006.01)
*G06F 1/32* (2006.01)
*G06F 3/00* (2006.01)

(52) U.S. Cl.
CPC ................................ *G06F 1/3203* (2013.01)
USPC ............ 713/340; 713/300; 713/320; 715/700

(58) Field of Classification Search
None
See application file for complete search history.

(56) References Cited

U.S. PATENT DOCUMENTS

| | | | |
|---|---|---|---|
| 6,639,572 B1 | 10/2003 | Little et al. | |
| 6,684,341 B1 * | 1/2004 | Malcolm et al. ............... | 713/320 |
| 6,697,953 B1 | 2/2004 | Collins | |
| 6,801,811 B2 | 10/2004 | Ranganathan et al. | |
| 6,803,895 B2 | 10/2004 | Knapp et al. | |
| 6,831,624 B1 | 12/2004 | Harrold | |
| 7,616,197 B1 | 11/2009 | Gettemy et al. | |
| 7,639,246 B2 | 12/2009 | Lee | |
| 7,821,490 B2 | 10/2010 | Fletcher et al. | |
| 2003/0210271 A1 | 11/2003 | King | |
| 2005/0026654 A1 * | 2/2005 | Perez et al. ................ | 455/556.2 |
| 2007/0002210 A1 | 1/2007 | Ho et al. | |
| 2007/0198864 A1 * | 8/2007 | Takase .......................... | 713/300 |
| 2007/0213041 A1 | 9/2007 | Horie | |
| 2008/0141049 A1 | 6/2008 | Hassan et al. | |
| 2009/0218957 A1 | 9/2009 | Kraft et al. | |
| 2010/0011235 A1 * | 1/2010 | Finkelstein et al. .......... | 713/324 |
| 2010/0231610 A1 | 9/2010 | Hoffman et al. | |
| 2010/0277511 A1 | 11/2010 | Karaoguz et al. | |
| 2010/0299338 A1 * | 11/2010 | Aarni et al. .................... | 707/759 |
| 2012/0134517 A1 * | 5/2012 | Sato .............................. | 381/150 |
| 2012/0210325 A1 * | 8/2012 | de Lind van Wijngaarden et al. ............................. | 718/103 |

OTHER PUBLICATIONS

Heimbuch, Jaymi, "Cutting Back on Colors for OLED Screens Boosts Cell Phone Battery Life by 40%", Retrieved at << http://www.treehugger.com/files/2009/07/cutting-back-on-colors-for-oled-screens-boosts-cell-phone-battery-life-by-40.php >>, Jul. 10, 2009, pp. 2.

* cited by examiner

*Primary Examiner* — Ji H Bae
(74) *Attorney, Agent, or Firm* — Bryan Webster; Kate Drakos; Micky Minhas

(57) ABSTRACT

An electronic device includes at least one memory unit, a plurality of applications residing on at least one of the memory units, a display screen and a portable power supply. The electronic device also includes a power management module, which has a power monitor for monitoring an amount of remaining power available from the portable power supply. A processor is operatively associated with the memory units, display screen and portable power supply. The processor is configured to indicate to a user that one or more predetermined ones of the applications should not be used in order to conserve power when the remaining power falls below the first threshold level.

16 Claims, 5 Drawing Sheets

INTELLIGENT USER DETERMINABLE POWER CONSERVATION IN A PORTABLE ELECTRONIC DEVICE

BACKGROUND

Portable computing and communication are increasingly important in many environments including home and business contexts. Important portable computing and communication capabilities include worldwide roaming, location based services, data connectivity and the like. Improvements in computer and network architecture and functionality have continually improved the user experience. As a result, the use of such portable devices such as laptops, handheld computers, personal digital assistants (PDA's) and mobile communication devices such as cellular phones and smartphones have become increasingly common. Currently, however, certain areas of portable technology fall short and prevent users from having full and rich experiences in portable computing and communication scenarios. For example, despite improvements in battery technology, users are still frustrated by the inability to use the laptop for an extended period of time without having to charge the battery. The lack of duration for portable devices is a prevalent and continuing problem and can lead to user frustration, loss of productivity, and lack of technology adoption by users.

SUMMARY

A power management system provides the user with the information he or she needs to prioritize which features and applications of a portable electronic device are to be used when the remaining power becomes low. In one implementation, when the power remaining in the electronic device falls below a certain threshold, the user is provided with visual cues to discourage them from using features on the device that consume high levels of power. For instance, when the power drops below a certain level, in one particular implementation the icons presented on the device display, which allow the user to start or open high power consumption applications such as a GPS, camera and/or a browser application, may be modified so that they are rendered in gray-scale while the remaining applications appear in color. In this way the user is informed that these applications will rapidly consume the remaining power, thereby discouraging their use.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
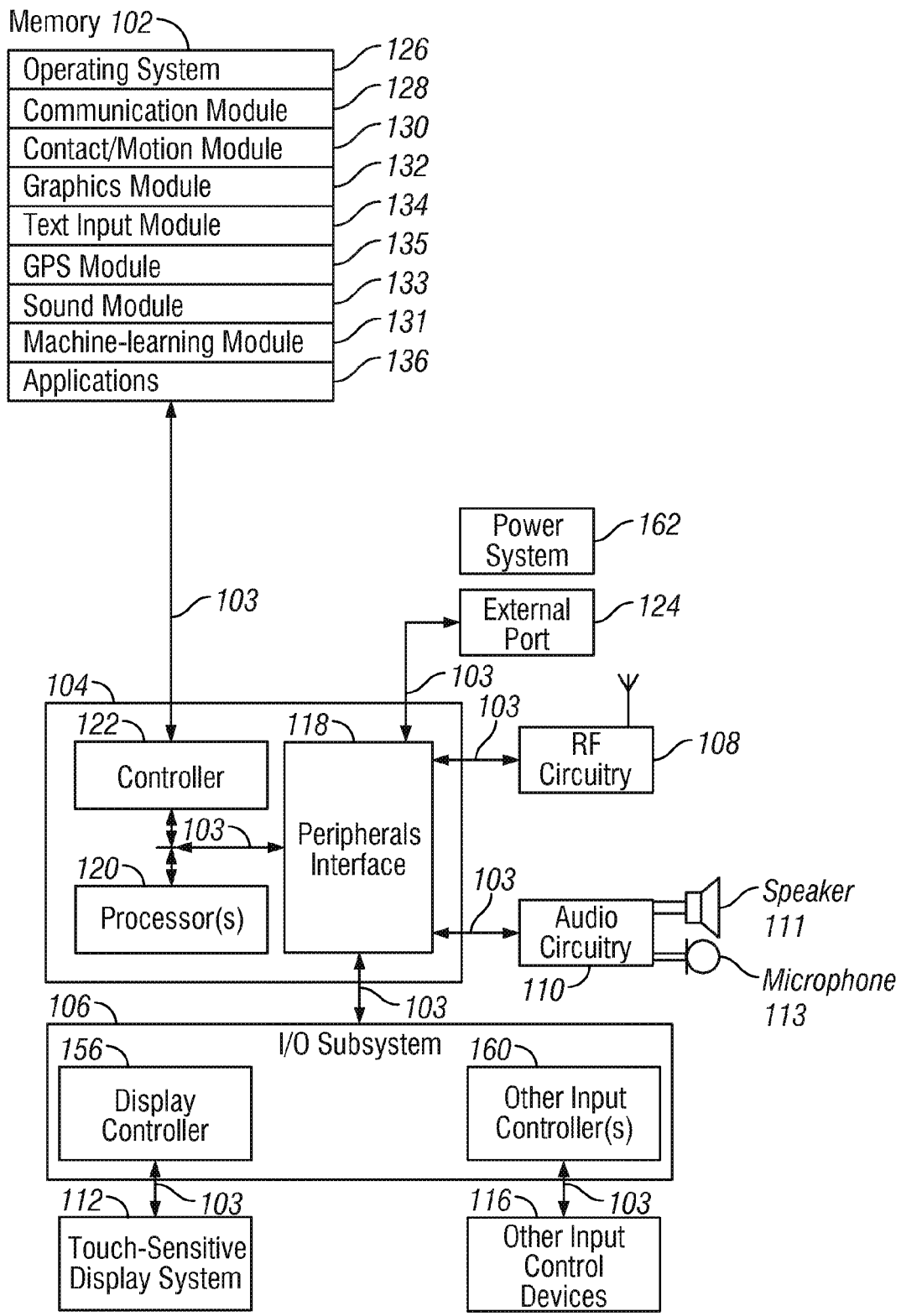
FIG. 1 is a block diagram illustrating one example of an electronic device that includes a portable power supply such as a battery.

FIG. 1 is a block diagram illustrating one example of an electronic device 100 that includes a portable power supply such as a battery. In some examples the device is a mobile communications device such as a wireless telephone that also contains other functions, such as PDA and/or music player functions. To that end the device may support any of a variety of applications, such as a telephone application, a video conferencing application, an e-mail application, an instant messaging application, a blogging application, a digital camera application, a digital video camera application, a web browsing application, a digital music player application, and/or a digital video player application. While the example in FIG. 1 is depicted as a mobile communications device, the electronic device more generally may by any of a wide variety of different devices that include a portable power supply such as a laptop computer, a tablet computer, a smart phone and a netbook, for example.

The device 100 includes a memory unit 102 (which may include one or more computer readable storage media), a memory controller 122, one or more processors (CPU's) 120, a peripherals interface 118, RF circuitry 108, audio circuitry 110, a speaker 111, a microphone 113, an input/output (I/O) subsystem 106, other input or control devices 116, and an external port 124. These components may communicate over one or more communication buses or signal lines 103.

It should be appreciated that the device 100 is only one example of a mobile communications device 100 and that the device 100 may have more or fewer components than shown, may combine two or more components, or a may have a different configuration or arrangement of components. The various components shown in FIG. 1 may be implemented in hardware, software or a combination of both hardware and software, including one or more signal processing and/or application specific integrated circuits.

Memory unit 102 may include high-speed random access memory and non-volatile memory, such as one or more magnetic disk storage devices, flash memory devices, or other non-volatile solid-state memory devices. Access to memory unit 102 by other components of the device 100, such as the CPU 120 and the peripherals interface 118, may be controlled by the memory controller 122. The peripherals interface 118 couples the input and output peripherals of the device to the CPU 120 and memory unit 102. The one or more processors 120 run or execute various software programs and/or sets of instructions stored in memory unit 102 to perform various functions for the device 100 and to process data. In some examples the peripherals interface 118, the CPU 120, and the memory controller 122 may be implemented on a single chip, such as a chip 104. In other examples they may be implemented on separate chips.

The RF (radio frequency) circuitry 108 includes a receiver and transmitter (e.g., a transceiver) for respectively receiving and sending RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from audible signals (i.e., sound waves). The speaker 111 and microphone 113 are two examples of audio transducers that may be employed in the mobile communications device. The audio circuitry 110 converts the electrical signal to audio data and transmits the audio data to the peripherals interface 118 for processing. Audio data may be retrieved from and/or transmitted to memory unit 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the display screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some examples input controller(s) 160 may be coupled to any (or none) of the following: a keyboard, infrared port, USB port, and a pointer device such as a mouse. The one or more buttons (e.g., 208, FIG. 1) may include an up/down button for volume control of the speaker 111 and/or the microphone 113. The one or more buttons may include a push button (e.g., 206, FIG. 1).

The display screen 112 provides an input interface and an output interface between the device and a user. The display controller 156 receives and/or sends electrical signals from/to the display screen 112. The display screen 112 displays visual output to the user. The visual output may include graphics, text, icons, video, and any combination thereof (collectively termed "graphics").

The display screen 112 will generally include a suitable display such as an OLED display, PLED display, active matrix liquid crystal display, passive matrix liquid crystal display, electrophoretic display, cholesteric liquid crystal display, polymer dispersed liquid crystal and nematic liquid crystal display. In some implementations the display screen 112 may be a touch-screen display.

The device 100 also includes a power system 162 for powering the various components. The power system 162 includes a portable power supply (e.g., battery) and components necessary to receive power from an alternating current (AC) source, a power management system, a recharging system, a power failure detection circuit, a power converter or inverter and any other components associated with the generation, management and distribution of power in portable devices.

In some embodiments, the software components stored in memory unit 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, a sound module 133 (or set of instructions) and applications (or set of instructions) 136.

The operating system 126 (e.g., Darwin, RTXC, LINUX, UNIX, OS X, Microsoft WINDOWS®, Android or an embedded operating system such as VxWorks) includes various software components and/or drivers for controlling and managing general system tasks (e.g., memory management, storage device control, power management, etc.) and facilitates communication between various hardware and software components. The communication module 128 facilitates communication with other devices over one or more external ports 124 and also includes various software components for handling data received by the RF circuitry 108 and/or the external port 124 (e.g., Universal Serial Bus (USB), FIREWIRE, etc.).

The graphics module 132 includes various known software components for rendering and displaying graphics on the display screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., applications that provide location-based services such as weather widgets, local yellow page widgets, and map/navigation widgets).

The applications 136 may include any combination of the following modules: a contacts module, a telephone module; a video conferencing module; an e-mail client module an instant messaging (IM) module; a blogging module; a camera module; an image management module; a video player module; a music player module; a browser module; a word processing module; a voice recognition module; a calendar module; widget modules, which may include a weather widget, stocks widget, calculator widget, alarm clock widget, dictionary widget, and other widgets obtained by the user, as well as user-created widgets.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory unit 102 may store a subset of the modules and data structures identified above. Furthermore, memory unit 102 may store additional modules and data structures not described above.

Figure 2:
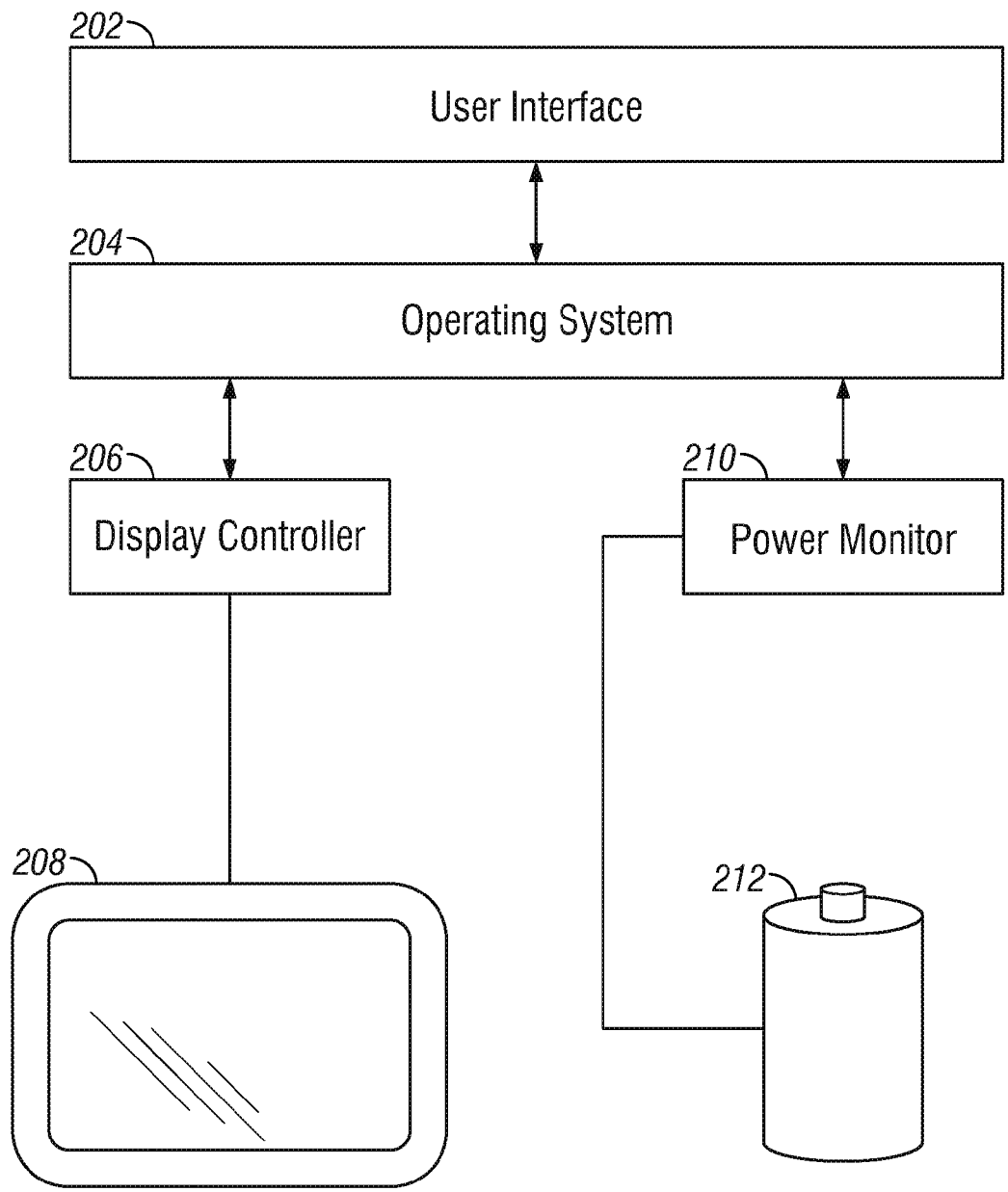
FIG. 2 shows one example of a system for configuring and managing power in an electronic device such as the device shown in FIG. 1.

FIG. 2 shows one example of a system for configuring and managing power in an electronic device such as the device shown in FIG. 1. The system, which may be incorporated into power system 162, includes a graphical, text-based or other user interface 202 that is presented to a user, through which the user can configure various settings for power management. The user interface 202 interacts with the operating system 204. The operating system 204 interacts with a low-level display controller 206 for controlling the output on the display 208. The operating system 204 further interacts with a power monitor module 210 for monitoring the status of a portable power supply 212 for the computing device. In some embodiments, the portable power supply 212 includes advanced monitoring capabilities to facilitate easy monitoring by the power monitor module 210. In other embodiments, the power monitor module 210 monitors voltage levels and/or other indicia from the power supply 212 to determine its status.

Some known power management systems establish one or more power thresholds. When the battery power falls below a threshold, these systems implement power saving actions. For example, one or more features of the device may be disabled. Other actions may reduce the power consumption of the display. For instance, the display may be dimmed or the image presented on the display may be converted from color to grayscale. Unfortunately, such global changes to the display can confuse users without informing them of any actions they can take to further reduce power consumption.

One illustrative situation in which the limitations of such power management systems become clear is when a mobile phone user is traveling for a period of time such as a day or two and has forgotten to bring along a battery charger. When the remaining power falls below some threshold (or when the indicia being monitored reaches some prescribed value) the display is dimmed and/or changed to grayscale. While this action conserves power and informs the user that the power is low, it does not provide the user with any information concerning which features or applications of the phone require relatively little power, and thus may still be used for a period of time, and which features or applications will deplete the remaining power very quickly.

This problem can be addressed by providing the user with visual cues to discourage them from using features on the mobile phone that consume high levels of power. For instance, when the power drops below a certain level, the icons which start or open high power consumption applications such as a GPS, camera and/or a browser application may be modified so that they are rendered in gray-scale while the remaining applications appear in color. By implementing a power management system that communicates to the user that some subset of the available features or applications should remain or become inactive, the user knows which applications may still be used for a period of time and which applications will rapidly consume the remaining power.

Figure 3:
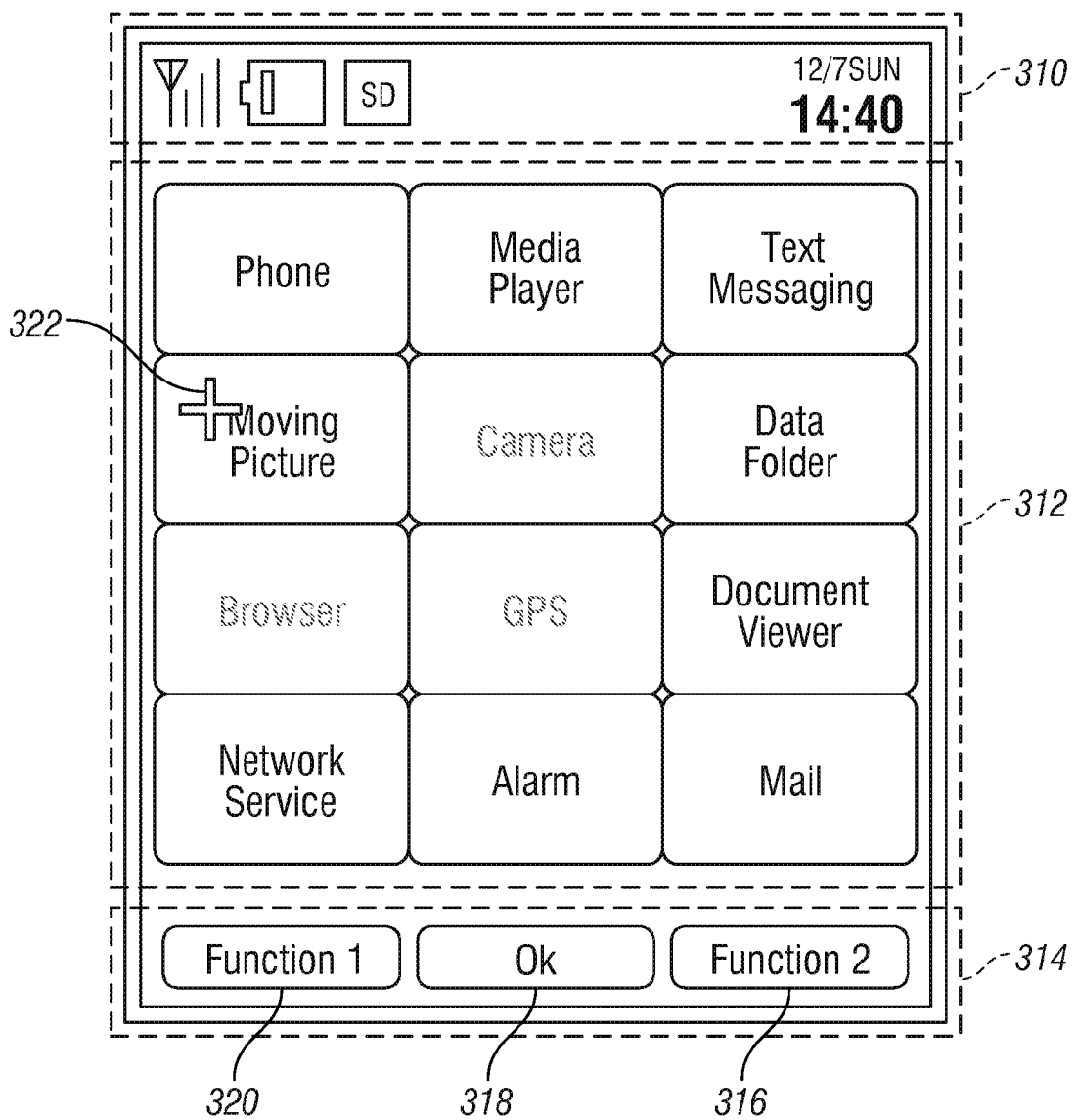
FIG. 3 shows one example of a mobile phone display screen.

FIG. 3 shows one example of a mobile phone display screen that includes a status display area 310 on the upper section of the screen, a main menu display area 312 on the middle section of the screen, and an operation menu display area 314 on the lower section of the screen. Among other things, status display area 310 includes a battery icon indicating the status of the power supply. The main menu display area includes an icon menu having a plurality of application icons, and an operation cursor 322 for the user to select any application icons that are displayed. The user selects an application icon by the operation of cursor 322 from the icon menu displayed on the main menu display area 312. In this way the user can cause his/her desired application to be executed on the mobile phone.

The operation menu display area 314 includes icons for applications such as a phone application, a media player application, a text messaging application, a browser application, a camera application, a GPS application and so on. In this example the remaining battery power has fallen below a threshold level so that the power management system takes steps to discourage the user from using high power applications. As the figure indicates, the browser, camera and GPS icons have been converted to gray scale or otherwise grayed out. This provides the user with a visual cue that those applications should not be used if the user wishes to conserve power for more potentially critical applications such the phone and text messaging applications, the icons for which remain in color. However, the applications whose icons have been converted to gray scale have not been disabled. In this way the user can intelligently decide how to best use the remaining power. For instance, even though the camera icon is grayed out, the user may nevertheless decide to use the remaining power to take one picture rather than say, make three short phone calls. In some implementations, however, the applications whose icons have been grayed out may be disabled, sometimes at a lower power level than the power level at which the icons have been grayed out.

The power threshold levels and the order in which application icons are modified to discourage their use may be established by default or they may be established by the user. In addition, there may be multiple pre-established power management schemes from which the user may choose. For instance, one default power management scheme may modify icons in order of decreasing power, so that the user is first discouraged from using applications that consume the most power and, as the power further decreases is discouraged from using progressively lower power consuming applications. In another example, a default power management scheme may discourage the use of applications based on a combination of their power consumption rate and some measure of their relative importance. For instance, in a mobile phone, a power-management scheme may be configured so that the icons for the phone and text messaging applications may never be modified. When the power falls below a first threshold level, however, icons for applications such as camera, GPS and map applications may be modified to discourage their use. When the power falls below an even lower second threshold level, icons for applications such as email and browser applications may be modified.

In the example discussed above, the visual cue that is provided to the user to discourage use of certain applications modifies the icon so that it appears in grayscale. More generally, however, the visual cue or cues may be presented in any suitable manner. For example, the visual cue may be a change in the size or color of the icons whose use is to be discouraged. In other cases the visual cue does not necessarily involve any modification to the icons. Rather, a message or warning may be presented when the user selects an icon in an attempt to activate the corresponding application. The message will indicate in text, graphics or the like, that the remaining power is sufficiently low so that the use of this application is not recommended. In other cases a message may be displayed on the screen without the user selecting an icon. In this case the message may simply list those applications whose use is not recommended because the remaining power is low.

Figure 4:
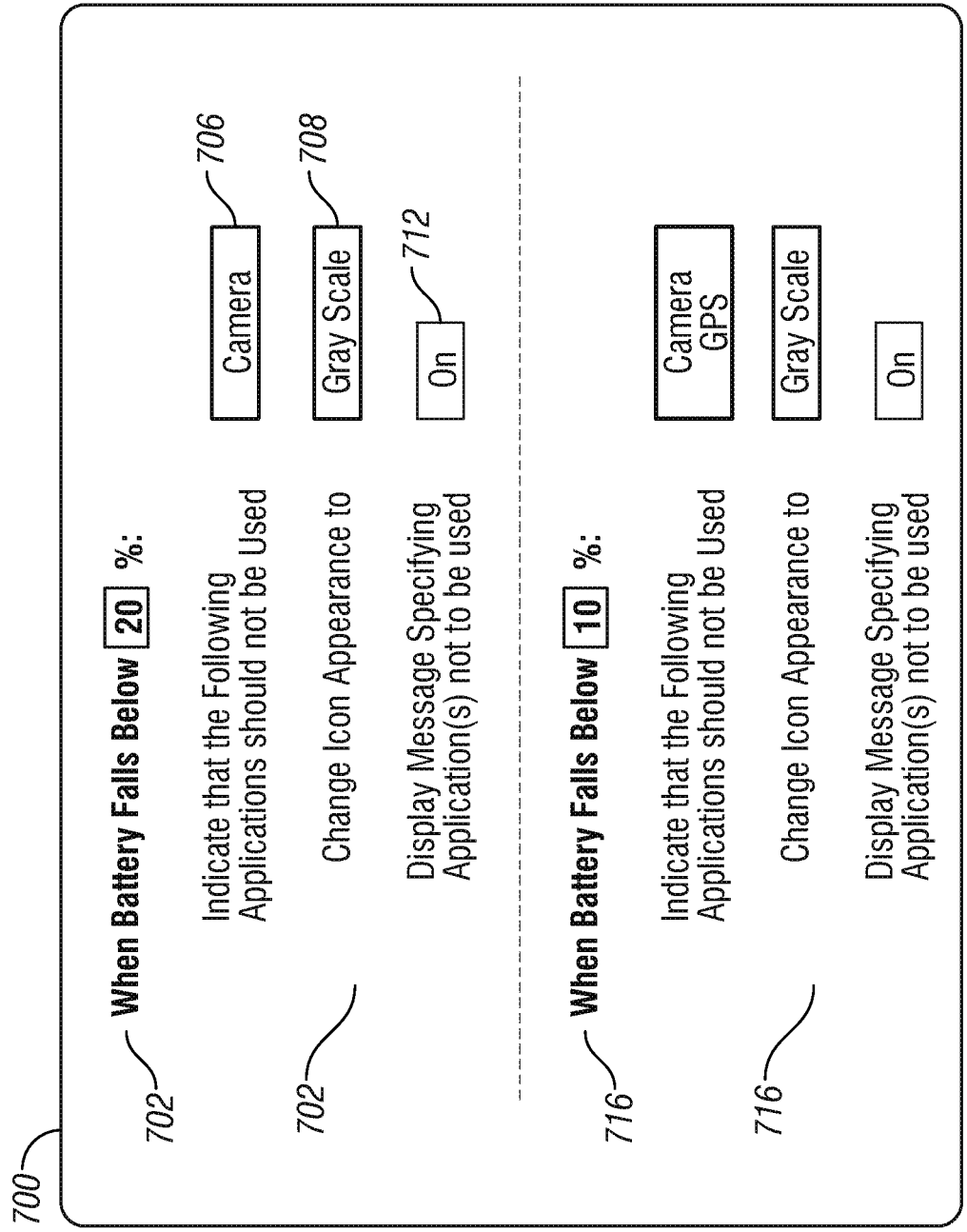
FIG. 4 shows one example of a user interface through which a user can configure power management features of an electronic device.

FIG. 4 shows one example of a user interface 700 through which a user can configure power management features of an electronic device. Values input into the user interface 700 are used by the operating system to provide visual or other cues using methods such as those described above. In a first section 702 of the user interface 700, the user can input a first threshold value 704, such that when the battery level drops below this threshold value 704, any of a number of cues may be presented. The user can specify one or more applications using menu 706 whose use should be discouraged when the power falls below the first threshold value 704. Another menu 710 allows the user to specify the manner in which the icons for those applications should be altered (if at all). The user may also be given the option 712 to display a message when the power falls below the first threshold, specifying those applications that preferably are not used. These options are only exemplary, and many other user options may be used additionally or alternatively in various implementations.

In a second portion 716 of the user interface 700, the user can input secondary threshold values and parameters, such that if battery power falls below the secondary threshold values, additional warnings and cues can be presented concerning additional applications that preferably should not be used.

Figure 5:
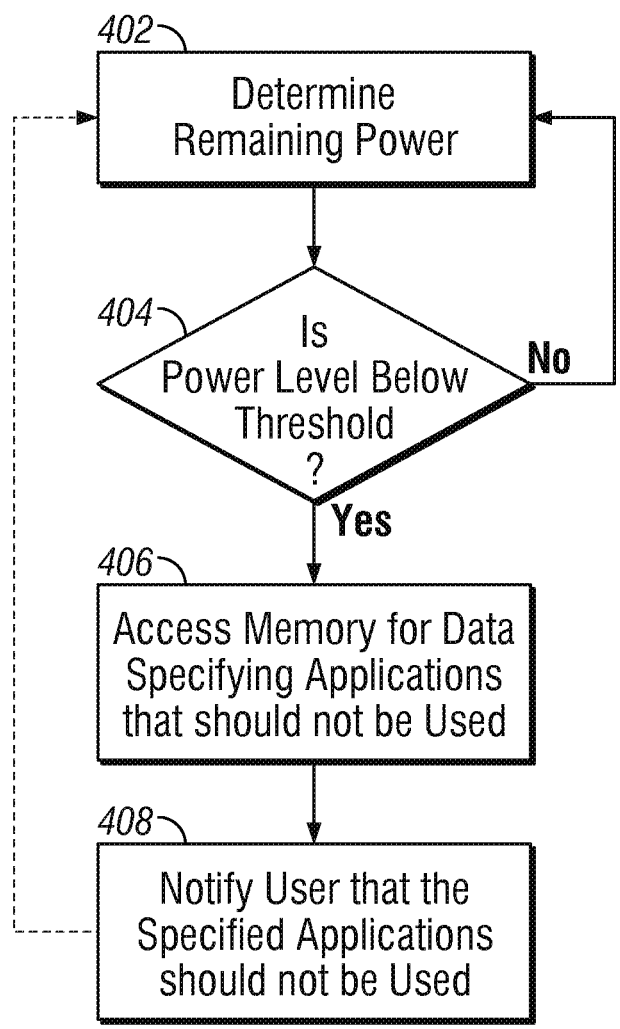
FIG. 5 is a flowchart of a method used to indicate to a user how they can conserve power in an electronic device having a portable power supply.

A method used in particular implementations to indicate to a user how they can conserve power in an electronic device having a portable power supply is described with reference to FIG. 5. The remaining power in an electronic device's battery or other power source is continuously monitored via steps 402 and 404. In particular, at step 402, the remaining power of the power source is determined, such as by receiving a voltage reading from the power source or by analyzing the source via a monitor. Subsequently, at step 404, if the power level has dropped below a threshold value (such as a percentage of capacity, voltage, etc.), then a memory is accessed to retrieve the data specifying applications which should not be used in order to conserve power. Otherwise the process returns to step 402 for further monitoring. The threshold value may be preset or may be user-configured. Notification that those specified applications should not be used is presented in step 408. That may be accomplished in a number of ways, including by presenting the user with a visual cue on the display screen. For instance, the visual indication may be a change in color (e.g., from full color to grayscale) of the icons associated with the specified application(s), a change in icon size, and so on. In one implementation, the method returns for further monitoring to step 402, so that the further notifications can be presented to the user should the battery level drop below yet another threshold value.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media, not comprising a propagated data signal, containing instructions which, when executed by one or more processors disposed in an electronic device having a portable power supply, perform a method comprising the steps of:

determining that an amount of remaining power available from the portable power supply falls below a first threshold level; and in response to the amount of remaining power falling below the first threshold level, indicating to a user that one or more predetermined applications residing on the electronic device should not be used in order to conserve power, said indication being provided for applications that are both active and inactive, wherein indicating to the user further comprises causing an icon presented on a display which opens each of the one or more predetermined applications to be modified in appearance to thereby indicate to the user that the one or more predetermined applications should not be used in order to conserve power, wherein said modification does not halt or prevent the execution of an application associated with the icon.

2. The one or more computer-readable storage media of claim 1 wherein the icon is modified so that it is rendered in grayscale instead of color.

3. The one or more computer-readable storage media of claim 1 wherein the icon is reduced in size.

4. The one or more computer-readable storage media of claim 1 wherein the one or more predetermined applications are selected by a default power management scheme.

5. The one or more computer-readable storage media of claim 4 further comprising a phone application, a camera application and a browser application, the one or more predetermined applications being selected by the default power management scheme including the camera and browser applications.

6. The one or more computer-readable storage media of claim 1 wherein indicating to the user further comprises presenting a message to the user on a display associated with the electronic device which identifies the one or more predetermined applications which should not be used in order to conserve power.

7. The one or more computer-readable storage media of claim 1, wherein the instructions further comprise instructions for: continuing to monitor the amount of power remaining in the power supply; determining that the remaining power falls below a second threshold level; and in response to the amount of remaining power falling below the second threshold level, indicating to the user that one or more additional applications should not be used in order to conserve power.

8. The one or more computer-readable storage media of claim 1 wherein the first threshold level is configured by the user.

9. The one or more computer-readable storage media of claim 1 wherein the one or more predetermined applications are selected by the user.

10. An electronic device, comprising:
    at least one memory unit storing computer-executable instructions;
    a plurality of applications residing on at least one of the memory units;
    a display screen;
    a portable power supply;
    a power management module, said power management module including a power monitor for monitoring an amount of remaining power available from the portable power supply; and
    a processor operatively associated with the memory units, display screen and portable power supply, wherein the computer-executable instructions when executed by said processor perform a method comprising: i) indicating to a user that one or more predetermined ones of the applications should not be used in order to conserve power when the remaining power falls below a first threshold level, and ii) providing the indication to the user for applications that are both active and inactive, wherein indicating to the user further comprises causing an icon presented on the display screen which opens each of the one or more predetermined ones of the applications to be modified in appearance to thereby indicate to the user that the one or more predetermined ones of the applications should not be used in order to conserve power, wherein said modification does not halt or prevent the execution of an application associated with the icon.

11. The electronic device of claim 10, at least one of the memory units being configured to store user-selectable settings defining one or more parameters specifying a manner in which the one or more predetermined applications that should not be used are indicated to the user.

12. The electronic device of claim 10, at least one of the memory units being configured to store user-selectable settings defining one or more parameters specifying the one or more predetermined applications that should not be used in order to conserve power.

13. A method for conserving battery power in an electronic device, comprising:
    monitoring an indicia of battery power remaining in the electronic device;
    if the indicia being monitored reaches a first prescribed value, implementing a power management scheme by communicating to a user that a first subset of features of the electronic device should remain or become inactive, said indication communication being provided for applications that are both active and inactive, wherein communicating to the user further comprises causing an icon presented on a display which opens each of a first subset of features be modified in appearance to thereby indicate to the user that the first subset of features should not be used in order to conserve power, wherein said modification does not halt or prevent the use of a feature associated with the icon.

14. The method of claim 13 wherein, if the indicia being monitored reaches a second prescribed value, implementing the power management scheme further comprises communicating to the user that in addition to the first subset of features, a second subset of features of the electronic device should remain or become inactive, wherein at least one of the features in the second set of features consumes more battery power than any of the features in the first subset of features.

15. The method of claim 13 wherein the icon is modified so that it is rendered in grayscale instead of color.

16. The method of claim 13 wherein at least on feature in the first subset of features is preselected by the user.

* * * * *